(No Model.)
H. F. NEUMEYER.
ELECTRIC BURGLAR ALARM.
No. 263,947. Patented Sept. 5, 1882.
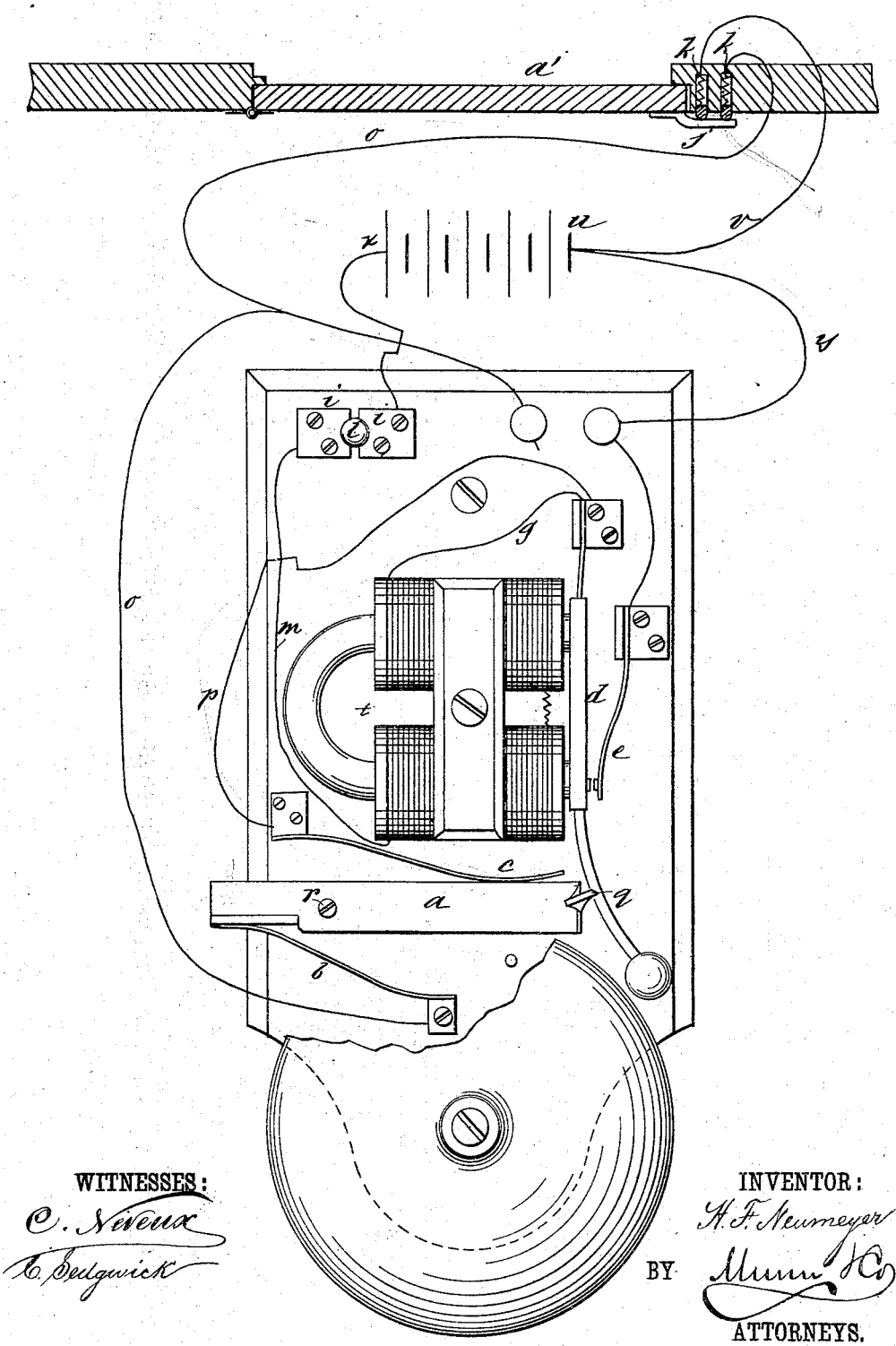
WITNESSES:
INVENTOR:
H. F. Neumeyer
BY Munn & Co
ATTORNEYS.

UNITED STATES PATENT OFFICE.

HORACE F. NEUMEYER, OF MACUNGIE, PENNSYLVANIA.

ELECTRIC BURGLAR-ALARM.

SPECIFICATION forming part of Letters Patent No. 263,947, dated September 5, 1882.

Application filed June 23, 1882. (No model.)

*To all whom it may concern:*

Be it known that I, HORACE F. NEUMEYER, of Macungie, Lehigh county, Pennsylvania, have invented a new and Improved Electric Burglar-Alarm, of which the following is a full, clear, and exact description.

My invention relates to an improvement in electric burglar-alarm apparatus, having for its object to prevent interference with the continuous sounding of the alarm by quickly closing the circuit by the burglar after entering; and it consists in the combination and arrangement of parts substantially as hereinafter more fully set forth.

Reference is to be had to the accompanying drawing, forming part of this specification, and which is a plan view of my improved alarm apparatus and a horizontal section of a door with which it is connected.

The door $a'$ has a plate, $j$, attached to it, which is in connection with springs $k$ when the door is shut, which, when the switch-pin $l$ is placed between the plates $i$ to set the alarm for the night and the metallic lever $a$, pivoted at $r$, is set in contact with springs $b$ and $c$, establishes a circuit through the line $v$ from copper plate $u$ of the battery through springs $k$, plate $j$, wires $o$, lever $a$, wire $p$, magnet $t$, wire $m$, plates $i$, and thence to zinc plate $x$ of the battery, whereby the magnet attracting armature $d$ causes a notch in it at $q$ to engage and hold lever $a$ in position, thus keeping up a constant circuit. If the door $a'$ is opened and the circuit broken, freeing the armature $d$ from lever $a$, said lever will fall away from spring $c$, its pivot being to the left of its center of gravity, or by the effect of the spring $b$, stronger than $c$, thus making a permanent break in the circuit, the object of which is to prevent the burglar from stopping the alarm quickly after entering by closing the circuit again by quickly closing the door. In this arrangement the alarm will continue after the circuit is thus broken by the circuit from copper $u$, through wire $y$, spring $e$, armature $d$, wire $g$, magnet $t$, wire $m$, and plates $i$, to battery at $x$, which closes at spring $e$ and armature $d$ simultaneously with the breaking of the other circuit at lever $a$ and spring $c$.

The apparatus is disconnected by withdrawing pin $l$ from between the plates $i$ when it is to be turned off.

Having thus described my invention, I claim as new and desire to secure by Letters Patent—

In an electric burglar-alarm, the combination, with the closed-circuit devices, of the gravity-lever $a$, disposed between the springs $b$ and $c$, one arranged in contact with the longer arm of said lever and the other stronger one in contact with the shorter arm thereof, the armature $d$, having the striking-arm disposed in contact with the lever $a$, the spring $e$, adapted to operate on the armature $d$, and the secondary circuit devices, substantially as shown and described, and for the purpose set forth.

HORACE F. NEUMEYER.

Witnesses:
WAYNE BITTING,
OLIVER NEUMEYER.